United States Patent
Cui et al.

(10) Patent No.: US 8,159,732 B2
(45) Date of Patent: Apr. 17, 2012

(54) APPARATUS AND METHOD FOR SCANNER SKEW ADJUSTMENT IN AN IMAGE FORMING DEVICE

(75) Inventors: Chengwu Cui, Lexington, KY (US); Adam Christopher Kelty, Georgetown, KS (US); Charles Brandon Langrel, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 608 days.

(21) Appl. No.: 12/262,884

(22) Filed: Oct. 31, 2008

(65) Prior Publication Data
US 2010/0110509 A1    May 6, 2010

(51) Int. Cl.
*H04N 1/04*    (2006.01)
*G06F 15/00*    (2006.01)
*B41J 2/47*    (2006.01)
*G06K 7/10*    (2006.01)
*E05D 7/04*    (2006.01)

(52) U.S. Cl. ......... 358/498; 358/1.9; 347/240; 382/321; 16/245

(58) Field of Classification Search .................. 358/474, 358/406, 496; 382/321; 399/32; 101/148
See application file for complete search history.

(56) References Cited

U.S. PATENT DOCUMENTS

| 4,764,976 | A  | * | 8/1988  | Kallin et al. | 382/321 |
| 7,639,392 | B2 | * | 12/2009 | Li et al.     | 358/1.9 |
| 7,777,773 | B2 | * | 8/2010  | Ng et al.     | 347/240 |
| 2008/0028573 | A1 | * | 2/2008 | Tsai et al.  | 16/245  |

* cited by examiner

*Primary Examiner* — Charlotte M Baker
*Assistant Examiner* — Rury Grisham

(57) ABSTRACT

An apparatus and methods of use for adjusting a sliding guide rod for an imaging device of a flatbed scanner to improve scanner skew misalignment comprising an attachment member movably mounting the sliding guide rod at one end thereof to one side of the flatbed scanner so as to allow skew-adjusting movement of the sliding guide rod at an opposite end thereof relative to the flatbed scanner and a skew adjustment assembly attached to an opposite side of the flatbed scanner and movably coupling and supporting the opposite end of the sliding guide rod to the opposite side of the flatbed scanner and being actuatable to cause the sliding guide rod to undergo skew adjustment relative to the flatbed scanner to correct scanner skew misalignment of the imaging device. The skew adjustment assembly includes a skew adjustment bracket mounted to the opposite side of the flatbed scanner and movably coupled to and supporting the opposite end of the sliding guide rod to the opposite side of the flatbed scanner and a tension spring and a plurality of bracket locking fasteners coacting with the skew adjustment bracket and movably actuatable relative thereto to move the sliding guide rod to undergo the skew adjustment relative to the flatbed scanner.

25 Claims, 5 Drawing Sheets

APPARATUS AND METHOD FOR SCANNER SKEW ADJUSTMENT IN AN IMAGE FORMING DEVICE

CROSS REFERENCES TO RELATED APPLICATIONS

None.

BACKGROUND

1. Field of the Invention

The present invention relates generally to an image forming device and, more particularly, to an apparatus and method for skew adjustment in an image forming device.

2. Description of the Related Art

Scanners are used to scan a target and create scanned image data which can be displayed on a computer monitor, which can be used by a computer program, which can be printed, which can be faxed, etc. Scanned data may be saved to memory or a magnetic or optical drive, or other fixed or removable memory device. Scanning devices may be packaged in a stand-alone housing or as part of an all-in-one device, including a printing module to perform scanning as well as standard copying functions.

Scanners typically include a housing aperture defined by an edge wherein a platen is located. A target document is positioned on the platen for scanning of the text or image by a scan bar. Depending on the positioning of the scanbar relative to the platen, the platen may be transparent where the scanbar is beneath the platen or may be solid where the scan bar is above the platen, which will have a transparent section to allow for the scan operation.

Common flatbed scanners consist of an image capture device, a mechanical drive system, and a platen glass. The document to be scanned is placed on the platen glass and the mechanical drive system moves the image capture device from one end of the document to the other thereby capturing the image. The mechanical drive system typically includes a metal sliding guide rod to help guide the image capture device across the flatbed scanner.

The mechanical drive system of a flatbed scanner often has variations or tolerances that can cause the image capture device to move slightly skewed compared to the original document. Further, the image capture device usually consists of a sensor array of one or more sensor lines and additional optical components on a frame. The sensor line(s) can be skewed to the frame despite efforts made during manufacturing to minimize the skew during the image capture device assembly process. The result scanned image can appear skewed either due to one of the two factors above, or a combination of the two.

Thus, there is still a need for an innovation that will allow the imaging device to be adjusted to eliminate skew when scanning originals. It is desirable for the adjustment to be made during the manufacturing assembly process as well as the capability to make the adjustment manually after assembly.

SUMMARY OF THE INVENTION

The present invention meets this need by providing an innovation that is an apparatus and method for adjusting the skew in a flatbed scanning device. The adjustment can be performed during the manufacturing or service by the customer.

Accordingly, in an aspect of the present invention an apparatus for adjusting a movable sliding guide rod for an imaging device of a flatbed scanner to improve scanner skew misalignment, comprises an attachment member fixedly mounting the movable sliding guide rod at one end thereof to one side of the flatbed scanner so as to allow skew-adjusting movement of the sliding guide rod at an opposite end thereof relative to the flatbed scanner and a skew adjustment assembly attached to an opposite side of the flatbed scanner and movably coupling and supporting the opposite end of the sliding guide rod to the opposite side of the flatbed scanner and being actuatable to cause the sliding guide rod to undergo skew adjustment relative to the flatbed scanner to correct scanner skew misalignment of the imaging device. The skew adjustment assembly includes a skew adjustment bracket mounted to the opposite side of the flatbed scanner and movably coupled to and supporting the opposite end of the sliding guide rod to the opposite side of the flatbed scanner and a tension spring coacting with the skew adjustment bracket and movably actuatable relative thereto to move the sliding guide rod to undergo the skew adjustment relative to the flatbed scanner and a plurality of bracket locking fasteners, such as screws and the like. The skew adjustment bracket coact together to rotate the sliding guide rod relative to the flatbed scanner in undergoing the skew adjustment to correct scanner skew misalignment of the imaging device. The bracket locking fasteners are adapted to undergo loosening and tightening relative to said skew adjustment bracket to enable coacting with said tension spring and said skew adjustment bracket to rotate the sliding guide rod. The tension spring and the skew adjustment bracket coact together to rotate the sliding guide rod in one or the other of opposite directions to cause corresponding skew adjusting movement of the imaging device in one or the other of opposite directions. A skew adjustment member could be placed externally on the flatbed scanner to allow manual adjustments of the imaging device.

According to another aspect of the present invention, a method for adjusting scanner skew during assembling flatbed scanner comprises assembling the flatbed scanner using nominal location for a backside imaging device, capturing scanned image, measuring the scanner skew based on the captured scanned image, determining the scanner skew adjustment to correct the measured scanner skew, and movably adjusting a sliding guide rod using a skew adjustment assembly mounted to a flatbed scanner to adjust for skew misalignment of the imaging device. The steps of capturing the image, measuring the image for scanner skew and determining the skew adjustment is repeated until the skew is within acceptable tolerance. The captured scanned image can be a standard chart with special fiducials and this image of the standard chart is used in measuring the scanner skew. The image of the standard chart can be processes automatically by employing a computer using image processing software which will display to the operator the skew adjustment amount required to correct the measured scanner skew. The scanner skew can also be measured by visually examining the scanned image which is either an electronic or hard copy of the image. The scanner skew adjustment is then determined by the operator based on the specific design and visual examination of the image.

According to still another aspect of the present invention, a method for adjusting scanner skew during normal use of flatbed scanner comprises capturing a scanned image, measuring the scanner skew based on the captured scanned image, determining the scanner skew adjustment to correct the measured scanner skew, and movably adjusting a sliding guide rod using a skew adjustment assembly mounted to a flatbed scanner to adjust for skew misalignment of the imaging device. The steps of capturing the image, measuring the image for scanner skew and determining the skew adjustment is repeated until the skew is within acceptable tolerance. The captured scanned image can be a standard chart with special fiducials and this image of the standard chart is used in measuring the scanner skew. The image of the standard chart can be processed automatically by employing a computer using image processing software which will display to the operator the skew adjustment amount required to correct the measured scanner skew. The scanner skew can also be measured by visually examining the scanned image which is either an electronic or hard copy of the image. The scanner skew adjustment is then determined by the operator based on the specific design and visual examination of the image.

According to yet another aspect of the present invention, a method for adjusting scanner skew during normal use of scanner in a multifunctional printer comprises capturing scanned image from a copy made by the multifunctional printer, measuring the copier skew based on the captured scanned image, determining the scanner skew adjustment to correct the measured copier skew, and movably adjusting a sliding guide rod using a skew adjustment assembly mounted to a flatbed scanner to adjust for skew misalignment of the imaging device.

BRIEF DESCRIPTION OF THE DRAWINGS

Figure 1:
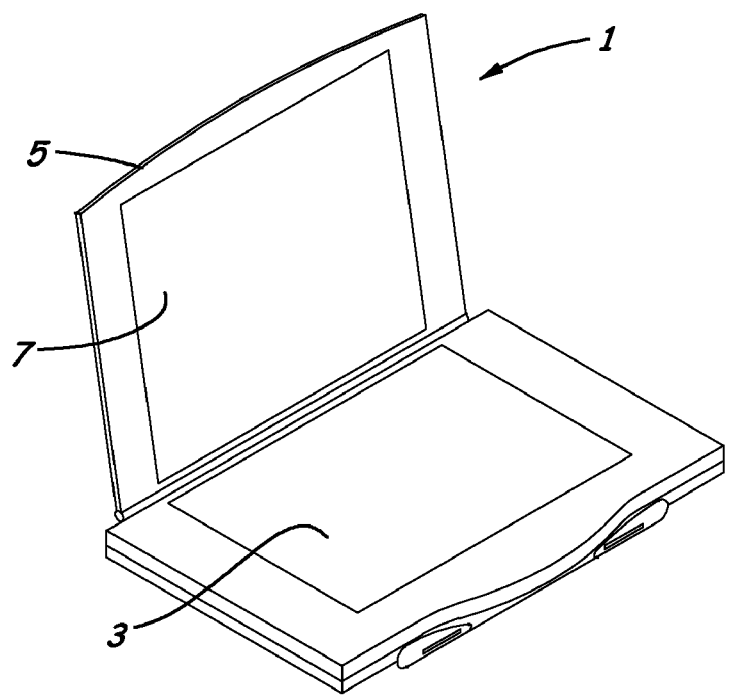

Having thus described the invention in general terms, reference will now be made to the accompanying drawings, which are not necessarily drawn to scale, and wherein:

FIG. 1 is a perspective view of flatbed scanner according to the present invention.

Figure 2:
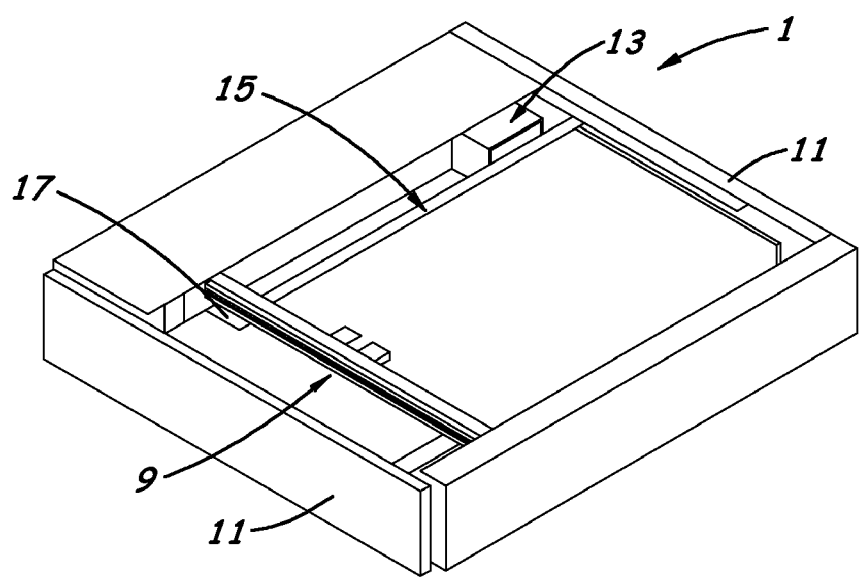

FIG. 2 is a perspective view of flatbed scanner with the external housing removed.

Figure 3:
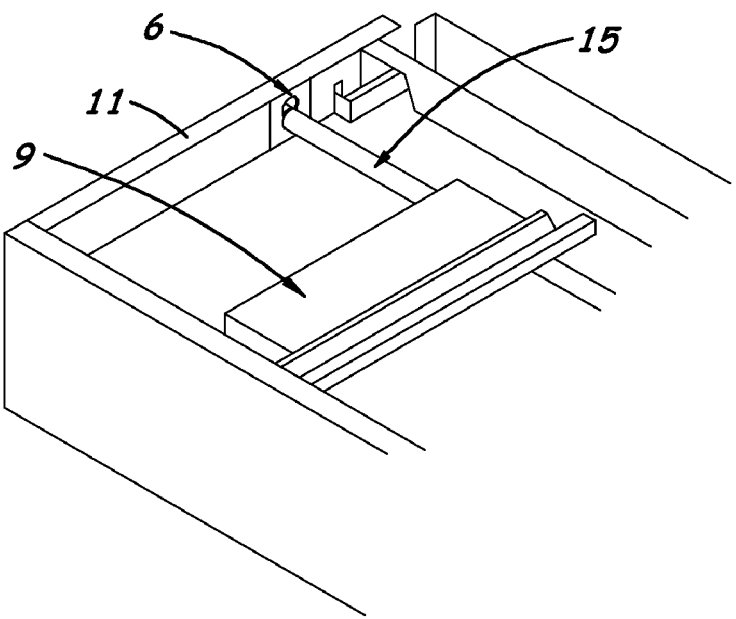

FIG. 3 is perspective view of a flatbed scanner with the external housing cover removed.

Figure 4:
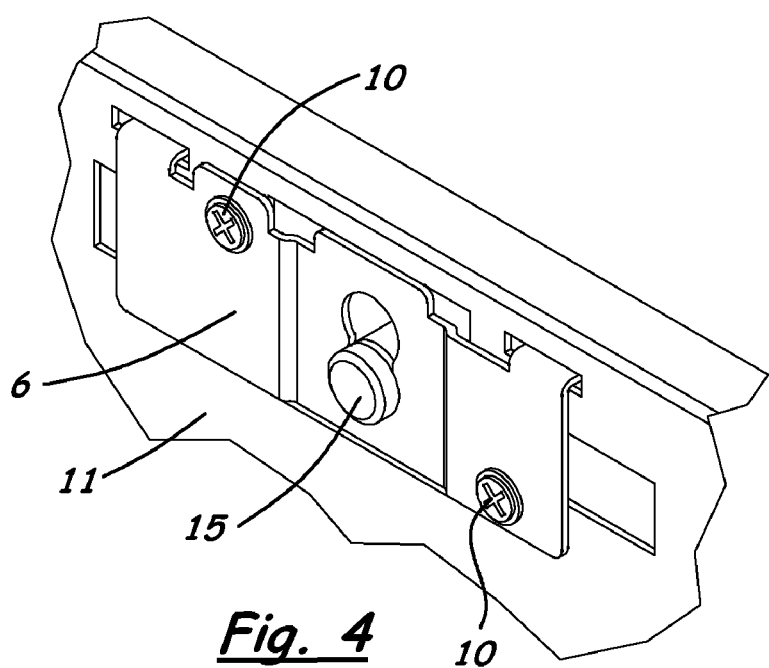

FIG. 4 is a perspective view of the exterior attachment of the skew adjustment assembly to the flatbed scanner.

Figure 5:
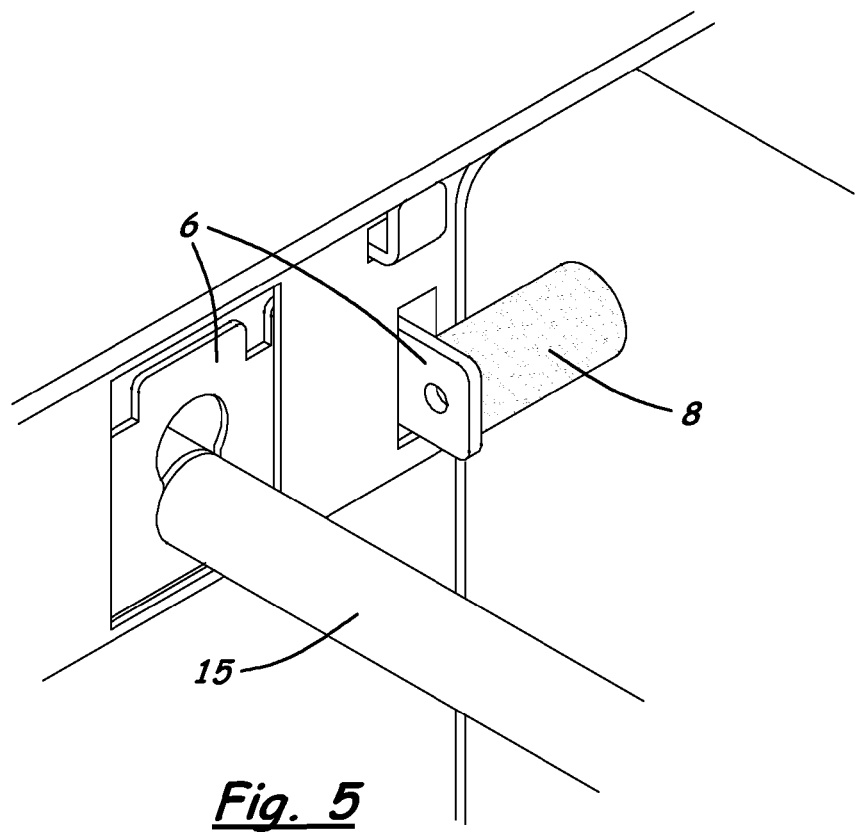

FIG. 5 is a perspective view of the interior attachment of the skew adjustment assembly to the flatbed scanner.

Figure 6:
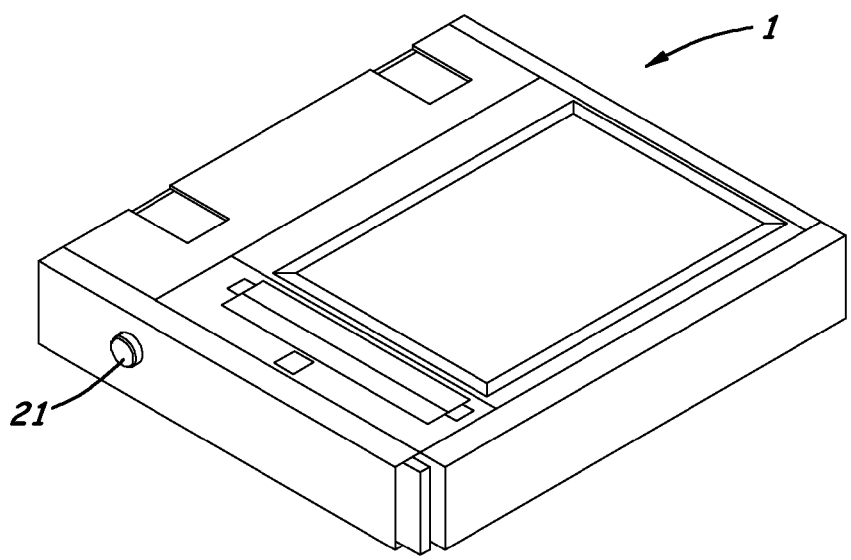

FIG. 6 is a perspective view of a flatbed scanner with lid removed and illustrating the external skew adjustment knob placement.

Figure 7:
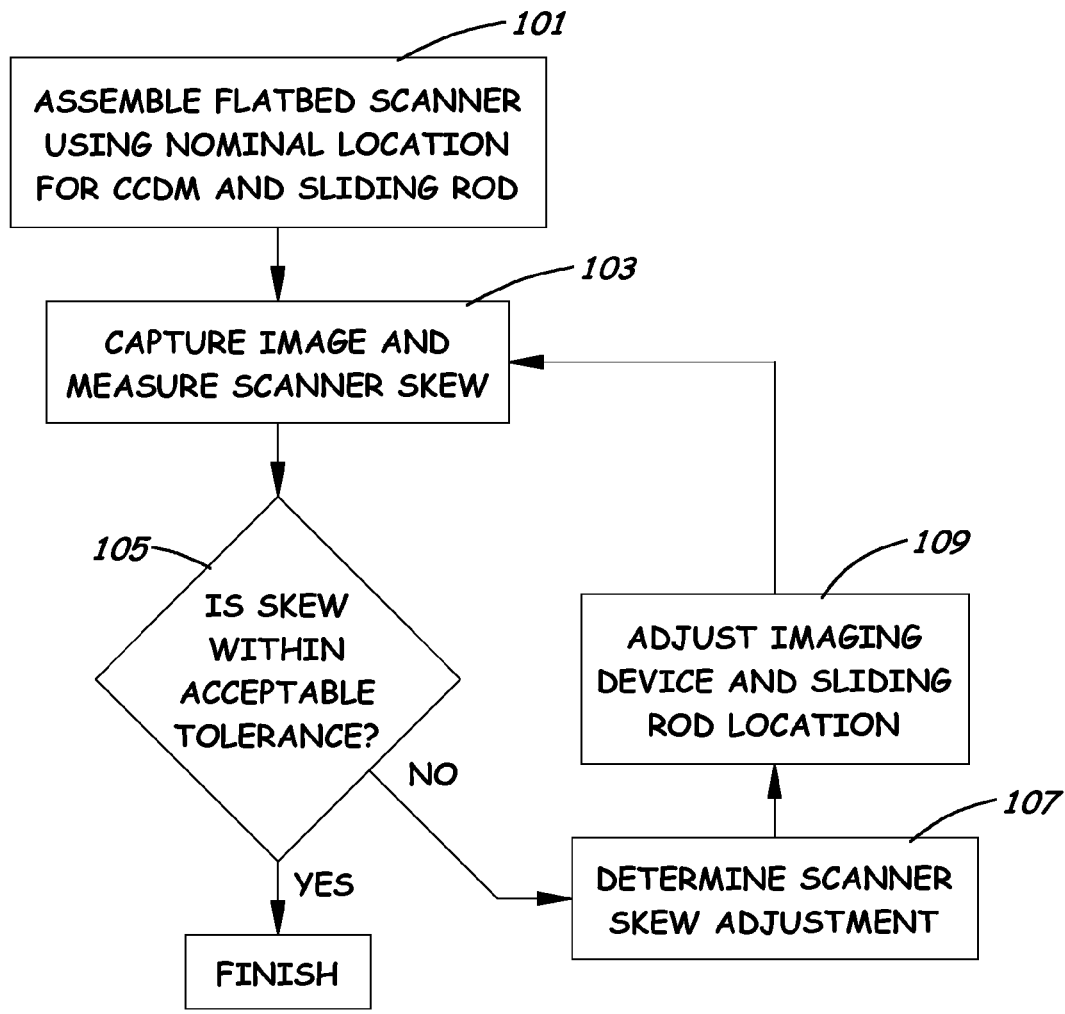

FIG. 7 is a flowchart depicting the method for adjusting scanner skew during assembling a flatbed scanner.

Figure 8:
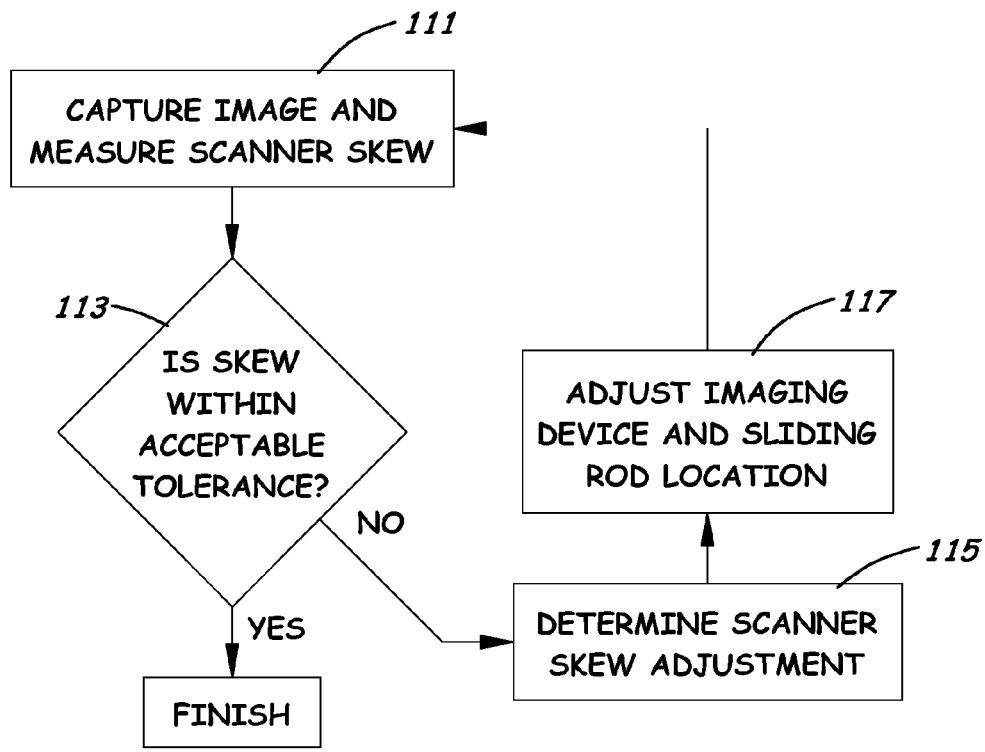

FIG. 8 is a flowchart depicting the method for adjusting scanner skew during normal use of a flatbed scanner.

Figure 9:
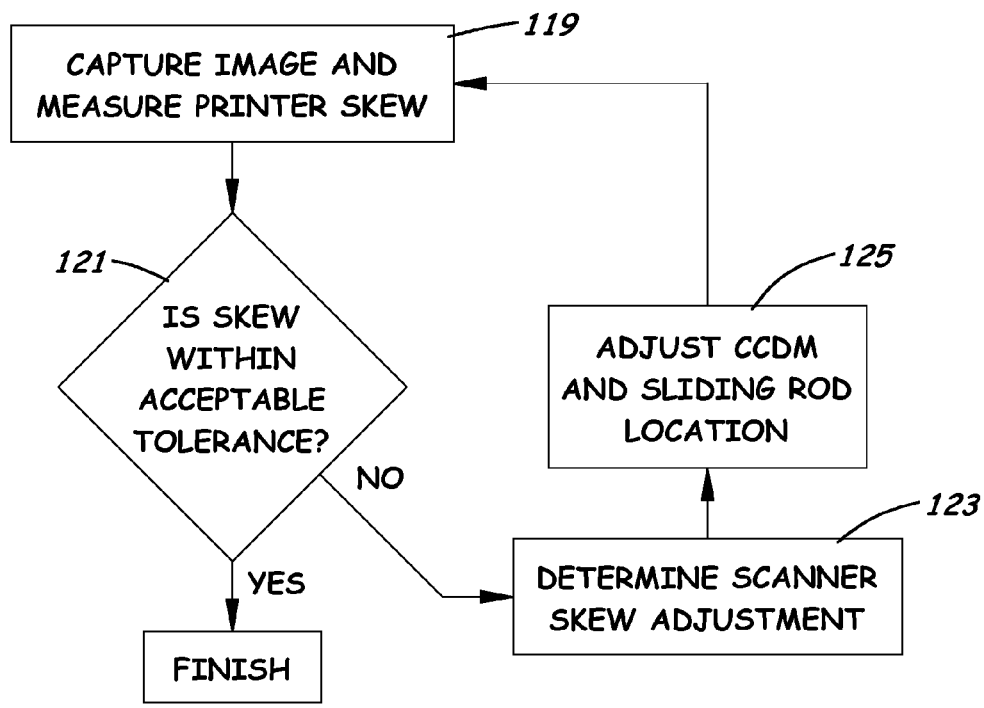

FIG. 9 is a flowchart depicting the method for adjusting scanner skew during normal use of flatbed scanner in a multifunctional printer.

DETAILED DESCRIPTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numerals refer to like elements throughout the views.

Referring now to FIG. 1 there is illustrated a flatbed scanner imaging device 1. The flatbed scanner imaging device 1 is shown and described herein, however one of ordinary skill in the art will understand upon reading of the instant specification that the present invention may be utilized with a printer, copier or other device utilizing a scanner system. The flatbed scanner imaging device 1 generally includes, a scanner bed 3, a lid 5, a document cover 7. Within the scanner bed 3 may be a transparent platen for placement and support of target media or original documents for manually scanning.

Referring now to FIG. 2, a perspective view of flatbed scanner with the external housing removed is shown is shown with an imaging device 9 having a plurality of parts which are not shown but are generally described herein. The imaging device may comprise a scanning motor and drive connecting the scanning motor and a scan bar. The scan bar is driven bi-directionally along a scanning axis defined as the direction of the longer dimension of the scanner bed 3. At least one guide bar may be disposed within the scanner bed 3 and may extend in the direction of the scanning axis to guide the scanner bar along the scanning axis. The scan bar moves along the at least one guide bar within the scanner bed beneath the platen. The scan bar has a length which extends in the short dimension of the scanning bed. Thus, the scan bar extends across one dimension of the scanner bed 3 and moves in a perpendicular dimension to scan an entire surface area of the platen during flatbed scanning.

The scan bar may include a lamp, an image sensor, and a plurality of mirrors therein for obtaining a scanned image from a document. The image sensor may be an optical reduction type image sensor or contact image sensor (CIS) as is known in the art. In either event, the image sensor then determines the image and sends data representing the image to onboard memory, a network drive, or a PC or server housing a hard disk drive or an optical disk drive such as a CD-R, CD-RW or DVD-R/RW. Alternatively, the original document may be scanned by the optical scanning component and a copy printed from the printer portion in the case of a multifunction peripheral device. The scan bar is generally either an optical reduction type using a combination of lens, mirror and a CCD (Charge Coupled Device) array or CIS array. The CCD array is a collection of tiny, light-sensitive diodes which convert photons into electrons. These diodes are called photosites—the brighter the light that hits a single photosite, the greater the electrical charge that will accumulate at that site. The image of the document that is scanned using a light source such as a fluorescent bulb reaches the CCD array through a series of mirrors, filters and lenses. The exact configuration of these components will depend on the model of the scanner. Some optical reduction scanners use a three pass scanning method. Each pass uses a different color filter (red, green, or blue) between the lens and CCD array. After the three passes are completed, the scanner software assembles the three filtered images into a single full-color image. Most optical reduction scanners use the single pass method. The lens splits the image into three smaller versions of the original. Each smaller version passes through a color filter (either red, green or blue) onto a discrete section of the CCD array. The scanner software combines the data from the three parts of the CCD array into a single full-color image. The CCD array has a longer focal length than a CIS and therefore may be preferable for the use in the instant invention.

Referring now to FIG. 2, a perspective view of flatbed scanner 1 with the external housing removed is shown. Two opposed side frames 11 form ends of the flatbed scanner 1. The side frames 11 of the flatbed scanner 1 provide a structure for locating shafts of the flatbed scanner 1. The side frames 11 also allow rotation of the various shafts and rollers. A gear train (not shown) is mounted to one side frame 11, causing rotation of gear shafts extending between the side frames 11. The gear train is driven by a motor 13 and is mounted to motor plate (not shown). The gear train has a pulley mounted belt (not shown) and the imaging device 9 is coupled to the pulley mounted belt to allow the imaging device 9 to be moved across the length of the flatbed scanner 1. Also shown is as sliding guide rod 15 that is used to guide the imaging device 9 across the flatbed scanner 1 parallel to the corresponding edge of the original document placed on the platen glass. The imaging device 9 has bushings 17 that control the fit to the sliding guide rod 15 while allowing the imaging device 9 to slide easily with minimal resistance.

Turning to FIGS. 3 and 4 a skew adjustment bracket 6 is shown on an opposite end of the flatbed scanner side frame 11. FIG. 4 illustrates the exterior attachment of the skew adjustment assembly to the flatbed scanner. As shown in both FIGS. 3 and 4, the sliding guide rod 15 is movably mounted to one end of the flatbed scanner side frame 11 and a skew adjustment bracket 6 attaches the sliding guide rod to the opposite side (not shown) of the flatbed scanner 1. The skew adjustment assembly includes a skew adjustment bracket 6 mounted to the opposite side of the flatbed scanner and movably coupled to and supporting the opposite end of the sliding guide rod 15 to the opposite side of the flatbed scanner 1. Turning to FIG. 5 illustrating the interior view of the skew adjustment assembly in a flatbed scanner, a tension spring 8 coacts with the skew adjustment bracket 6 and moves the sliding guide rod 15 relative to the flatbed scanner. The skew adjustment bracket 6 coact together to rotate the sliding guide rod 15 relative to the flatbed scanner in undergoing the skew adjustment to correct scanner skew misalignment of the imaging device 9 as shown in FIG. 3. As shown in FIG. 5, bracket locking fasteners 10 are adapted to undergo loosening and tightening relative to the skew adjustment bracket 6 to enable the skew adjustment bracket 6 to rotate the sliding guide rod 15. An external manual skew adjustment member 21 as shown in FIG. 6 could be placed externally on the flatbed scanner 1 to allow manual adjustments of the backside imaging device.

Turning to FIG. 7, a flowchart depicting the method for adjusting scanner skew during assembling flatbed scanner is shown. The flatbed scanner 1 is assembled in step 101 using nominal location for a backside imaging device. A scanned image is captured and the scanner skew is measured in step 103. It is determined in step 105 whether the scanner skew is within an acceptable tolerance. If the scanner skew is within an acceptable tolerance then the method is complete. If the scanner skew is not within an acceptable tolerance, the skew adjustment is determined in step 107 and the imaging device 9 is rotated in step 109 with the sliding guide rod 15 shown in FIGS. 2-5 to correct the measured scanner skew. The steps of capturing the image and measuring the image for scanner skew 101, determining if the scanner skew is within acceptable tolerance 105, determining the skew adjustment 107 and performing the skew adjustment 109 is repeated until the skew is within acceptable tolerance. The captured scanned image can be a standard chart with special fiducials and this image of the standard chart is used in measuring the scanner skew. The image of the standard chart can be processed automatically by employing a computer using image processing software which will display to the operator the skew adjustment amount required to correct the measured scanner skew. The scanner skew can also be measured by visually examining the flatbed scanned image which is either an electronic or hard copy of the image. The scanner skew adjustment is then determined by the operator based on the specific design and visual examination of the image.

Turning to FIG. 8, a flowchart depicting the method for adjusting scanner skew during normal use flatbed scanner is shown. A scanned image is captured and the scanner skew is measured in step 111. It is determined in step 113 whether the scanner skew is within an acceptable tolerance. If the scanner skew is within an acceptable tolerance then the method is complete. If the scanner skew is not within an acceptable tolerance, the skew adjustment is determined in step 115 and the imaging device 9 is rotated in step 117 with the sliding guide rod 15 shown in FIGS. 2-5 to correct the measured scanner skew. The steps of capturing the image and measuring the image for scanner skew 111, determining if the scanner skew is within acceptable tolerance 113, determining the skew adjustment 115 and performing the skew adjustment 117 is repeated until the skew is within acceptable tolerance. The captured scanned image can be a standard chart with special fiducials and this image of the standard chart is used in measuring the scanner skew. The image of the standard chart can be processed automatically by employing a computer using image processing software which will display to the operator the skew adjustment amount required to correct the measured scanner skew. The scanner skew can also be measured by visually examining the flatbed scanned image which is either an electronic or hard copy of the image. The scanner skew adjustment is then determined by the operator based on the specific design and visual examination of the image.

Turning to FIG. 9, a flowchart depicting the method for adjusting scanner skew during normal use of flatbed scanner in a multifunctional printer is shown. A scanned image is captured from a copy made by a multi-functional printer and the copier skew is measured in step 119. It is determined in step 121 whether the scanner skew is within an acceptable tolerance. If the scanner skew is within an acceptable tolerance then the method is complete. If the scanner skew is not within an acceptable tolerance, the skew adjustment is determined in step 123 and the imaging device 9 is rotated in step 125 with the sliding guide rod 15 shown in FIGS. 2-5 to correct the measured scanner skew. The steps of capturing the image and measuring the image for copier skew 119, determining if the scanner skew is within acceptable tolerance 121, determining the skew adjustment 123 and performing the skew adjustment 125 is repeated until the skew is within acceptable tolerance.

The foregoing description of several embodiments of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

What is claimed is:

1. An apparatus for adjusting a guide rod for an imaging device of a flatbed scanner to improve scanner skew misalignment, comprising:
   an attachment member movably mounting the guide rod at a first end thereof to one side of the flatbed scanner so as to allow skew-adjusting movement of the guide rod at a second end thereof relative to the flatbed scanner; and
   a skew adjustment assembly movably attached to an opposite side of the flatbed scanner and supporting the second end of the guide rod at the opposite side of the flatbed scanner and being actuatable to cause the sliding, wherein lateral movement of the skew adjustment assembly along the opposite side of the flatbed scanner causes the second end of the guide rod to undergo skew adjustment relative to the flatbed scanner to correct scanner skew misalignment of the imaging device.

2. The apparatus of claim 1 wherein said skew adjustment assembly includes:

a skew adjustment bracket slidably mounted to the opposite side of the flatbed scanner and supporting the second end of the guide rod;

a tension spring connected to the skew adjustment bracket for providing a biasing force on the skew adjustment bracket in a lateral direction along the opposite side of the flatbed scanner and the guide rod to undergo the skew adjustment relative to the flatbed scanner; and a plurality of bracket locking fasteners for fastening the skew adjustment bracket against the opposite side of the flatbed scanner.

3. The apparatus of claim 2 wherein said tension spring and said skew adjustment bracket coact together to cause the guide rod to rotate or pivot about said first end in undergoing the skew adjustment to correct scanner skew misalignment of the imaging device.

4. The apparatus of claim 2 wherein said plurality of bracket locking fasteners undergo loosening to allow sliding movement of the skew adjustment bracket along the opposite side of the flatbed scanner, and tightening to fasten said skew adjustment bracket against the opposite side of the flatbed scanner.

5. The apparatus of claim 2 wherein said tension spring and said skew adjustment bracket coact together to rotate the second end of the guide rod in one or the other of opposite directions to cause corresponding skew adjusting movement of the imaging device in one or the other of opposite directions.

6. A method for adjusting scanner skew during assembling of a flatbed scanner, comprising:
    assembling the flatbed scanner using nominal location for an imaging device;
    capturing a scanned image;
    measuring the scanner skew based on the captured scanned image;
    determining the scanner skew adjustment to correct the measured scanner skew; and
    movably adjusting a guide rod by sliding a skew adjustment assembly movably mounted to a side of the flatbed scanner and supporting one end of the guide rod to adjust for skew misalignment of the imaging device.

7. The method of claim 6 further comprising repeating said capturing, said measuring and said determining to decide if skew is now within acceptable tolerance.

8. The method of claim 6 wherein said captured scanned image is of a standard chart with special fiducials and said measuring includes using the image of the standard chart in measuring the scanner skew.

9. The method of claim 8 wherein said measuring includes processing the image of the standard chart automatically by employing a computer using image processing software.

10. The method of claim 6 wherein said measuring the scanner skew includes visually examining the scanned image.

11. The method of claim 10 wherein said visually examining includes viewing an electronic copy of the scanned image.

12. The method of claim 10 wherein said visually examining includes viewing a hardcopy of the scanned image.

13. The method of claim 6 wherein said determining includes basing the scanner skew adjustment on the specific design and a calculated skew by the operator.

14. The method of claim 6 wherein said determining includes basing the scanner skew adjustment on a visual examination of the scanned image.

15. A method for adjusting scanner skew during normal use of a flatbed scanner comprising:
    capturing a scanned image;
    measuring the scanner skew based on the captured scanned image;
    determining the scanner skew adjustment to correct the measured scanner skew; and
    movably adjusting a guide rod using a skew adjustment assembly slidably mounted to a side of the flatbed scanner and supporting one end of the guide rod to adjust for skew misalignment of the imaging device.

16. The method of claim 15 further comprising repeating said capturing, said measuring and said determining to decide if skew is now within acceptable tolerance.

17. The method of claim 15 wherein said captured scanned image is of a standard chart with special fiducials and said measuring includes using the image of the standard chart in measuring the scanner skew.

18. The method of claim 17 wherein said measuring includes processing the image of the standard chart automatically by employing a computer using image processing software.

19. The method of claim 15 wherein said measuring the scanner skew includes visually examining the scanned image.

20. The method of claim 19 wherein said visually examining includes viewing an electronic copy of the scanned image.

21. The method of claim 19 wherein said visually examining includes viewing a hardcopy of the scanned image.

22. The method of claim 15 wherein said determining includes basing the scanner skew adjustment on the specific design and a calculated skew by the operator.

23. The method of claim 15 wherein said determining includes basing the scanner skew adjustment on a visual examination of the scanned image.

24. An apparatus, comprising:
    a flatbed scanner having a platen and an image capture component for moving between a first side of the flatbed scanner to a second side thereof;
    a guide rod beneath the platen for guiding movement of the image capture component;
    an attachment member movably mounting the guide rod at a first end thereof to the first side of the flatbed scanner so as to allow skew-adjusting movement of the guide rod at a second end thereof relative to the second side of the flatbed scanner; and
    a skew adjustment assembly movably attached to the second side of the flatbed scanner and supporting the second end of the guide rod wherein movement of the skew adjustment assembly along the second side of the flatbed scanner causes movement of the second end of the guide rod along the second side of the flatbed scanner.

25. The apparatus of claim 24, further comprising:
    a tension spring connected to the skew adjustment bracket for providing a biasing force on the skew adjustment bracket in a direction along the second side of the flatbed scanner and the guide rod to undergo the skew adjustment relative to the flatbed scanner; and
    a plurality of bracket locking fasteners for fastening the skew adjustment bracket against the opposite side of the flatbed scanner.

* * * * *